United States Patent [19]

Shintani et al.

[11] Patent Number: 4,736,288
[45] Date of Patent: Apr. 5, 1988

[54] DATA PROCESSING DEVICE

[75] Inventors: Yooichi Shintani, Pittsburgh, Pa.; Tohru Shonai, Kokubunji; Shigeo Takeuchi, Hannou, both of Japan

[73] Assignee: Hitachi, Ltd., Tokyo, Japan

[21] Appl. No.: 682,839

[22] Filed: Dec. 18, 1984

[30] Foreign Application Priority Data

Dec. 19, 1983 [JP] Japan ................. 58-237777

[51] Int. Cl.⁴ .............................................. G06F 7/38
[52] U.S. Cl. ..................... 364/200; 364/736
[58] Field of Search ............. 364/736, 200 MS File, 364/730

[56] References Cited

U.S. PATENT DOCUMENTS

| 3,537,074 | 10/1970 | Stokes et al. | 364/200 |
| 3,787,673 | 1/1974 | Watson et al. | 364/200 X |
| 3,840,861 | 10/1974 | Amdahl et al. | 364/200 |
| 3,962,706 | 6/1976 | Dennis et al. | 364/900 |
| 4,085,450 | 4/1978 | Tulpule | 364/900 |
| 4,136,383 | 1/1979 | Takesue | 364/200 |
| 4,152,763 | 5/1979 | Shimoi | 364/200 |
| 4,435,765 | 3/1984 | Uchida et al. | 364/200 |
| 4,532,589 | 7/1985 | Shintani et al. | 364/200 |
| 4,594,655 | 6/1986 | Hao et al. | 364/200 |
| 4,626,989 | 12/1986 | Torii | 364/200 |
| 4,628,436 | 12/1986 | Okamoto et al. | 364/131 |

OTHER PUBLICATIONS

Johnson, "An Introduction to Vector Processing", Computer Design, Feb. 1978, pp. 89-97.
R. M. Tomasulo, "An Efficient Algorithm for Exploiting Multiple Arithmetic Units", IBM Journal, Jan. 1967, pp. 25-33.
Sofer et al., "Parallel Pineline Organization of Execution Unit", IBM Tech. Disclosure Bulletin, vol. 14, No. 10, Mar. 1972, pp. 2930-2933.

Primary Examiner—Emanuel S. Kemeny
Assistant Examiner—Tan V. Mai
Attorney, Agent, or Firm—Antonelli, Terry & Wands

[57] ABSTRACT

A data processing device which is equipped with a plurality of arithmetic units so that a plurality of instructions may be processed in parallel by the plural arithmetic units. The device includes a register control circuit for assigning one of a plurality of physical registers to store instructions when more than one of the instructions requires the use of the same logical register. This correspondence between the physical and logical registers is maintained while instructions are subsequently transferred to the arithmetic units where they are processed in parallel.

7 Claims, 10 Drawing Sheets

| OP | $R_1$ | $(X_2)$ | $(B_2)$ | $D_2$ |
|----|-------|---------|---------|-------|
| MD | 0 | , | | A |
| STD | 0 | , | | B |
| LD | 0 | , | | C |
| AD | 0 | , | | D |

| | CYCLE | C0 | C1 | C2 | C3 | C4 | C5 |
|---|---|---|---|---|---|---|---|
| | INSTRUCTION REGISTER | — | MD | STD | LD | AD | — |
| | DS | X | ○ | ○ | ○ | ○ | X |
| OUTPUT SIGNAL OF DECODER | L | | X | X | ○ | X | |
| | W | | ○ | X | ○ | ○ | |
| | IW | | F0 | — | F0 | F0 | |
| | IR | | F0 | F0 | — | F0 | |
| | R | | ○ | ○ | X | ○ | |
| VIRTUAL REGISTER CONTROL CIRCUIT 3 | JW | | P0 | — | P4 | P4 | |
| | JR | | P0 | P0 | — | P4 | |
| | OC | | X | ○ | X | X | |
| PARALLEL OPERATION CONTROL CIRCUIT 4 | B0 | | ○ | ← | ← | ← | |
| | W0 | | ○ | ○ | ○ | ○ | |
| | JW0 | | P0 | P0 | P0 | P0 | |
| | R0 | | ○ | X | X | X | |
| | JR0 | | P0 | — | — | — | |
| | LAW0 | MD— | — | — | — | — | |
| | SET0 | | ○ | X | X | X | |
| | BOP0 | | ○ | X | X | X | |
| | EOP0 | | X | X | X | ○ | |
| | B1 | | | ○ | ← | ← | ← |
| | W1 | | | X | X | X | X |
| | JW1 | | | — | — | — | — |
| | R1 | | | ○ | ○ | ○ | ○ |
| | JR1 | | | P0 | P0 | P0 | P0 |
| | LAN1 | | STD— | E0 | E0 | E0 | E0 |
| | SET1 | | | ○ | X | X | X |
| | BOP1 | | | X | X | X | ○ |
| | EOP1 | | | X | X | X | ○ |
| | B2 | | | | ○ | ○ | ← |
| | W2 | | | | ○ | ○ | ○ |
| | JW2 | | | | P4 | P4 | P4 |
| | R2 | | | | X | ○ | X |
| | JR2 | | | | — | P4 | — |
| | LAW2 | | | LD— | — | — | — |
| | SET2 | | | | ○ | ○ | X |
| | BOP2 | | | | ○ | ○ | X |
| | EOP2 | | | | ○ | X | ○ |
| | LA | | E0 | E1 | E2 | E2 | |

FIG. 7(b)

| | CYCLE | C0 | C1 | C2 | C3 | C4 | C5 |
|---|---|---|---|---|---|---|---|
| PHYSICAL REGISTER STATUS BIT | W(0) LAW(0) B(0) A(0) | MD | o EO o | ← ← o | ← ← o o | ← ← o o | o o |
| | W(4) LAW(4) B(4) A(4) | | | LD | o E2 o | o E2 o AD | ← o |
| SELECTOR 506 | LAW | — | — | E0 | — | E2 | — |
| TRANSLATION TABLE 502 | JWF 0 2 4 6 | P0 P1 P2 P3 | ← ← ← ← | ← ← ← ← | ← ← ← ← | P4 ← ← ← | ← ← ← ← |

| ARITHMETIC UNIT STATUS BIT NAME | Bi | Ri | JRi | Wi | JWi | LAWi |
|---|---|---|---|---|---|---|
| CONTROLLING METHOD | • MAKING ON IF SET i SIGNAL : ON<br>• MAKING OFF IF EOPi SIGNAL : ON | • MAKING ON IF SET i SIGNAL : ON & R SIGNAL : ON<br>• MAKING OFF IF BOPi SIGNAL : ON | • SETTING VALUE OF JR SIGNAL IF SET i SIGNAL : ON | • MAKING OFF IF EOPi SIGNAL : ON<br>• MAKING ON IF SET i SIGNAL : ON & W SIGNAL : ON | • SETTING VALUE OF JW SIGNAL IF SET i SIGNAL : ON | • SETTING VALUE OF LAW SIGNAL IF SET i SIGNAL : ON |

DATA PROCESSING DEVICE

BACKGROUND OF THE INVENTION

1. Field of the Invention

The present invention relates to a digital computer and, more particularly, to a data processing device with increased speed due to parallel processing of a plurality of instructions.

2. Description of the Prior Art

The IBM 360/91 exists as an example of a general purpose computer with increased speed due to parallel processing of a plurality of instructions. This computer is disclosed in detail in IBM Journal Jan. 1967, "An Efficient Algorithm for Exploiting Multiple Arithmetic Units". The computer adopts a common data bus system (which will be referred to as a "CDB system") so as to eliminate factors blocking the parallel processing, which are caused by the repeated uses of an identical register between adjoining instructions. According to this system, an instruction having the arithmetic result of a preceding instruction as an input operand is made to stand by at a Reservation Station (which will be referred to as an "RS", corresponding to a queue of the instruction) and is taken into the input operand of the RS through a common data bus CDB, as soon as said arithmetic result is attained, so that the arithmetic is started from the instruction by which all the input operands are defined. In this CDB system, the RS has to be equipped therein with two registers for first and second operands in respect to all the instructions, and the number of the registers takes a value of 2N and the maximum number of the instructions being processed in the system may take a value N, thus presenting a problem that the logical scale has to be enlarged. In case the arithmetic results are attained simultaneously by a plurality of arithmetic units, there arises a problem in that the common data bus CDB has trouble with the transfer of said arithmetic results to a plurality of arithmetic units requiring them.

SUMMARY OF THE INVENTION

An object of the present invention is to eliminate the problems described above and to provide a data processing device which is free from the factors obstructing the parallel processing caused by the repeated use of an identical register between adjoining instructions so that it can conduct highly parallel processings.

In order to achieve the object, when a succeeding instruction B, which is so assigned as to store an arithmetic result in a register b identical to the storing register of a preceding instruction A, is to be processed, the arithmetic result of the instruction B is stored in a physically different register b', and is read out therefrom, in case said arithmetic result of the instruction B is read out in accordance with a subsequent instruction, so that the succeeding instruction B can be executed without awaiting the execution of the preceding instruction A. According to the construction of the present invention, it is sufficient to provide an N number of physical registers so that the maximum number of instructions to be processed simultaneously in the system may take the value N.

According to the present invention, moreover, the arithmetic results are written, in case they are attained simultaneously by the plural arithmetic units, in physically different registers, respectively, and the respective arithmetic units are so constructed as to read out data independently from the physical registers so that the arithmetic results can be transferred simultaneously to the plural arithmetic units.

BRIEF DESCRIPTION OF THE DRAWINGS

FIGS. 7($a$) and 7($b$) are time charts of signals, registers and so on of the present invention in the instruction processing of FIG. 2;

DETAILED DESCRIPTION OF THE PREFERRED EMBODIMENT

The present invention will be described in the following in connection with one embodiment thereof. For convenience of description, there is premised a machine which is based upon the M-series architechture of Hitachi, Ltd.

Figure 1:
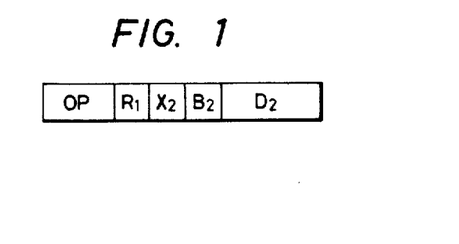
FIG. 1 shows a typical instruction format.

FIG. 1 shows a typical instruction format. Specifically, an instruction is composed of: an OP field indicating the content of an arithmetic; an $R_1$ field indicating the number of a register to be stored with a first operand; an $X_2$ field indicating the number of an index register for preparing a memory address of a second operand; a $B_2$ field indicating the number of a base register; and a $D_2$ field indicating a displacement.

Figure 2:
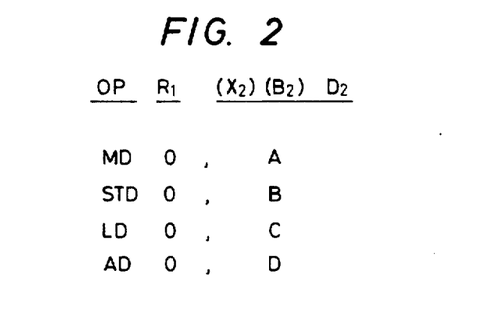
FIG. 2 shows an example of a row of instructions which can be parallel-processed according to the present invention.

FIG. 2 shows an example of the instruction sequence which can be parallel-processed in a parallel processing machine using the present invention. A first instruction MD is one for executing multiplication of a floating point number, and the product of a data in a zeroth floating point number register (which will be referred to as an "FRO") and a data at an address A in a memory is stored in the FRO. A second instruction STD is a store instruction for storing the data of a floating point number register in a memory, and the data in the FRO is stored at an address B. A third instruction LD is a load instruction for storing a data of a memory in a floating point number register, and a data at an address C is stored in the FRO. A fourth instruction AD is for summing up floating point numbers, and the sum of a data in the FRO and a data at an address D is stored in the FRO.

Figure 3:
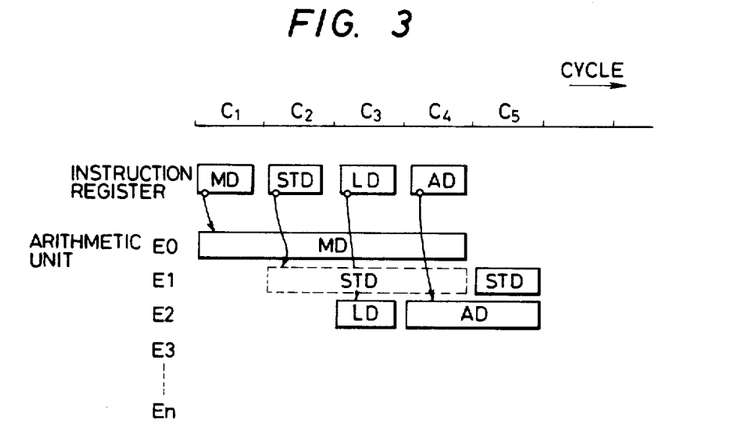
FIG. 3 shows schematically the processing stage of the instruction row of FIG. 2 according to an embodiment of the present invention.

FIG. 3 is a time chart showing schematically the case in which the instruction sequence shown in FIG. 2 is executed in the parallel processing machine using the present invention. An abscissa indicates the number of cycle times i.e., a processing time unit at a first cycle (which is referred to as "C1") from the left and second to fifth cycles (which will be referred to as "C2 to C5" following sequentially. There are vertically shown an instruction reigster for holding an instruction to be processed, and (n+1) arithmetic units E0, E1, ..., and En which can operate independently of one another. The instruction MD set in an instruction register in the C1 instantly starts the arithmetic unit E0, in which the arithmetic is executed during the four cycles C1 to C4 so that the result is stored in the FR0 at the end of the cycle C4. When the arithmetic unit E0 is started, the instruction register is set with an instruction to be processed next. Specifically, in the cycle C2, the instruction STD is set to instantly start the arithmetic unit E1. Since, in this case, the content of the FR0, necessary for the instruction STD, is the result of the preceding instruction MD, the arithmetic unit E1 is held in its queued status until the arithmetic result of the instruction MD is written in the FR0, and the FR0 is read out and stored in the memory in the cylce C5. In the cycle C3, on the other hand, the instruction LD is set in the instruction register to instantly start the arithmetic unit E2. At this time, neither the write-in of the result into the FR0, which is to be stored with the memory data in response to the instruction LD, by the preceding instruction MD nor the read-out by the instruction STD from the FR0 has been finished yet. In the present invention, however, the FR0 to be loaded in response to the instruction LD is assigned to physically correspond to another register FR0', said instruction LD is instantly processed in the cycle C3, and the result is stored. The instruction LD occupies the arithmetic unit E2 only in the cycle C3, therefore the arithmetic unit E2 can accept the arithmetic of a succeeding instruction in the cycle C4. Next, in the cycle C4, the instruction Ad starts the arithmetic unit E2 instantly when it is set in the instruction register. The content of the register necessary for the arithmetic of the instruction AD is read out from the register FR0' which is newly assigned for storing the result of the instruction LD. The instruction AD starts the arithmetic from the cycle C4 and ends in the cycle C5 to store the result in the FR0'.

By assigning the logical register, which is designated by the $R_1$ portion of the instruction upon appearance of the instruction LD, to a physically different register (as is called a "virtual register system"), as in the above, the processings of the two instructions MD and STD and the processings of the two instructions LD and AD can be executed in parallel in the plurality of arithmetic units.

The construction and operations of the parallel processing machine will be described in the following with reference to FIGS. 4 to 7.

Figure 4:
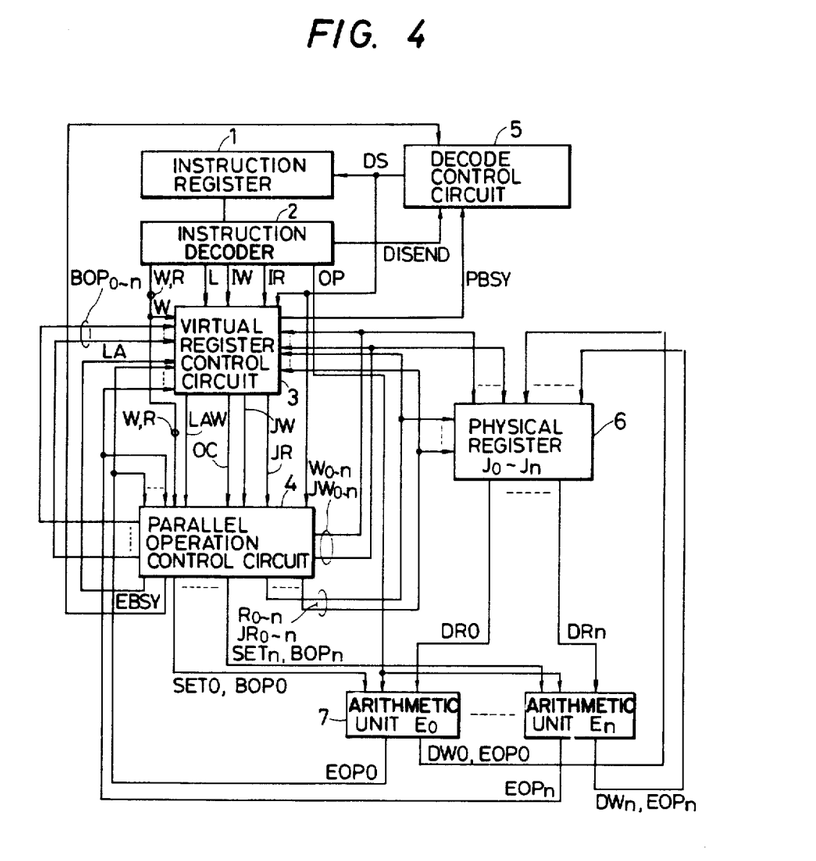
FIG. 4 shows the overall construction of the embodiment of the present invention.

FIG. 4 shows an example of the overall construction.

Indicated at numeral 1 is an instruction register for holding an instruction to be processed. The instruction reading-out logic necessary for setting an instruction in the instruction register 1 is not shown, and its description is omitted because it is unnecessary for the description of the present invention and can be construction by well-known techniques. The instruction in the instruction register is sent to and decoded by an instruction decoder 2. Among the data of the decoded instruction outputted from the instruction decoder 2, the following are necessary for describing the present invention:

(1) OP: the OP field of the instruction indicating the content of the arithmetic.

(2) W: indicates that said instruction is one of the type (which will be called a "W-type instruction") for storing the result in the floating point register.

(3) IW: indicates the number of the register for storing the result in the W-type instruction. The M-series architecture is equipped with four floating point registers which are identified as F0, F2, F4 and F6. Therefore, the number IW takes any of the values 0, 2, 4 and 6.

This number IW is also called a "logical register number" in contrast to a later-described physical register number. In other words, the logical register is one which is defined by said architecture and which can be designated by a program.

(4) R: indicates that said instruction is one of the type (which will be called an "R-type instruction") by which the content of the floating point register is read out as an operation number or an operated number.

(5) IR: indicates the number of a register to read out an operand in the R-type instruction. This number IR is also a logical register number represented by any of 0, 2, 4 and 6.

(6) L: indicates an instruction of such a type (which will be called as an "L-type instruction") of the W-type instruction for which is required a newly assigned physical register to store the result.

Among the outputs of the instruction decoder 2, the OP field is sent to the arithmetic units E0 to En. The data W, IW, R, IR and L are sent to a virtual register control circuit 3. Moreover, the data W and R are also sent to a parallel operation control circuit 4.

(7) DISEND: indicates that the instruction decoding data (1) to (7) can be outputted. This data is sent to a decode control circuit 5.

The virtual register control circuit 3 is made operative to convert the logical register numbers IW and IR into corresponding physical register numbers JW and JR and to monitor the reference status to the physical registers thereby to output as a signal OC that the result of the preceding instruction for the physical register to be read out by a certain instruction is detected to be not-stored (which will be called "that said instuction is in operand conflict with the preceding instruction"). When the L-type instruction is to be decoded, the virtual register control circuit 3 outputs as a signal PBSY that there is no physical register to be newly assigned.

The parallel operation control circuit 4 monitors the states of the arithmetic units E0 to En to generate the following signals:

(1) EBSY: indicates that all the arithmetic units are occupied. This signal is sent to the decode control circuit 5 to suppress a decode end signal DS which indicates that the instructions set in the instruction register 1 have been decoded. The signal DS is also suppressed when the signal PBSY is outputted. When the instructions are decoded completely with the result of the signal DS, a next instruction is set in the instruction register 1. The signal DS is also sent out to the virtual register control circuit 3 and the parallel operation control circuit 4.

(2) SETi (i=0 to n): indicates that the arithmetic of the instruction being decoded should be executed in the arithmetic unit Ei. The parallel operation control circuit 4 selects an empty arithmetic unit Ei from the arithmetic units E0 to En to issue the signal SETi corresponding to the instant when the signal DS is raised. At this time, the arithmetic unit Ei takes in the OP field of the instruction sent from the instruction decoder 2. The signal SETi is sent to a corresponding arithmetic unit Ei.

(3) JRi (i=0 to n): indicates a physical register number which is stored in an input operand necessary for the instruction set up in the arithmetic unit Ei.

This signal JRi is sent to a group of physical registers 6 and the virtual register control circuit 3. The grouped physical registers 6 are equipped with (m+ 1) physical registers Jo and Jn. Here, the number (m+1) of the physical registers required is a value exceeding the number of the logical registers (e.g., 4 in the case of the M-series floating point registers) and is preferred to be more so as to improve the instruction parallel processing performance parallelism. The content of the physical register indicated at the signal JRi is read out from the grouped physical registers 6 and is sent out as a signal DRi (i=0 to n) to the arithmetic unit Ei.

(4) BOPi (i=0 to n): indicates that the arithmetic may be started and is issued when the input operand necessary for the instruction set up in the arithmetic unit Ei is taken out from the signal DRi. The signal BOPi is suppressed from being issued either while said instruction is in operand confliction with the preceding instruction or until arrival in case the read-out of the necessary memory operand is delayed. In case the issue of the signal BOPi is delayed for the latter reason, its control is conducted by an operand read-out circuit. However, this circuit is not necessary for the description of the present invention and can be constructed by the well-known techniques. Therefore, the circuit is not shown, and its description is omitted. In the description of the present embodiment, it is assumed that there be no delay in reading out that memory operand. As is apparent from the description thus far made, the signal BOPi is issued simultaneously with the signal SETi in the absence of the operand conflict or otherwise at the instant when the operand conflict is eliminated.

The signal BOPi is sent out to the arithmetic unit Ei and the virtual register control circuit 3.

The arithmetic unit Ei takes in the input operand, which is sent out as the signal DRi, when the signal BOPi is raised, thereby to start the operation.

(5) LA: indicates the arithmetic unit among the E0 to En set up with said instruction. This signal is sent out to the virtual register control circuit 3.

(6) Wi (i=0 to n): indicates that the instruction set up in the arithmetic unit Ei is the W-type instruction. This signal is sent out to the grouped physical registers 6 and the virtual register control circuit 3.

(7) JWi (i=0 to n): indicates the number of a physical register which is to be stored with the arithmetic result when the instruction set up in the arithmetic unit Ei is of the W-type.

The signal JWi is sent out to the grouped physical registers 6 and the virtual register control circuit 3.

The arithmetic unit Ei (i=0 to n) is enabled to execute the arithmetic of all the instructions, respectively, and sends out the arithmetic result DWi to the grouped physical registers 6. The arithmetic unit Ei sends out, at the end of the arithmetic, the signal EOPi indicating the end to the grouped physical registers 6, the virtual register control circuit 3 and the parallel operation control circuit 4.

The grouped physical registers 6 stores an arithmetic result DWi in the physical register indicated at the signal JWi if the signal Wi is a binary 1 (i.e., if the instruction arithmetically executed by the arithmetic unit Ei is of the W-type) when the signal EOPi is issued.

Figure 8:
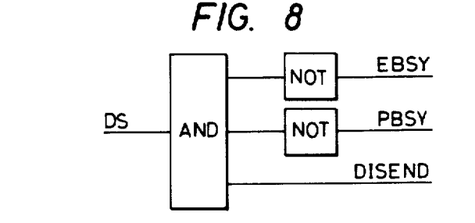
FIG. 8 shows the internal construction of a decode control circuit 5.

Next, the internal construction of the decode control circuit 5 will be described in the following with reference to FIG. 8.

The decode control circuit 5 is made receptive of the signals EBSY, PBSY and DISEND. The decode control circuit 5 outputs the DS signal when the signals EBSY and PBSY are not sent and when the signal DISEND is sent. In other words, the DS signal is outputted when there is an arithmetic unit which is not occupied, and when there is a physical register to be newly assigned, and when the instruction decode data can be outputted.

Figure 5:
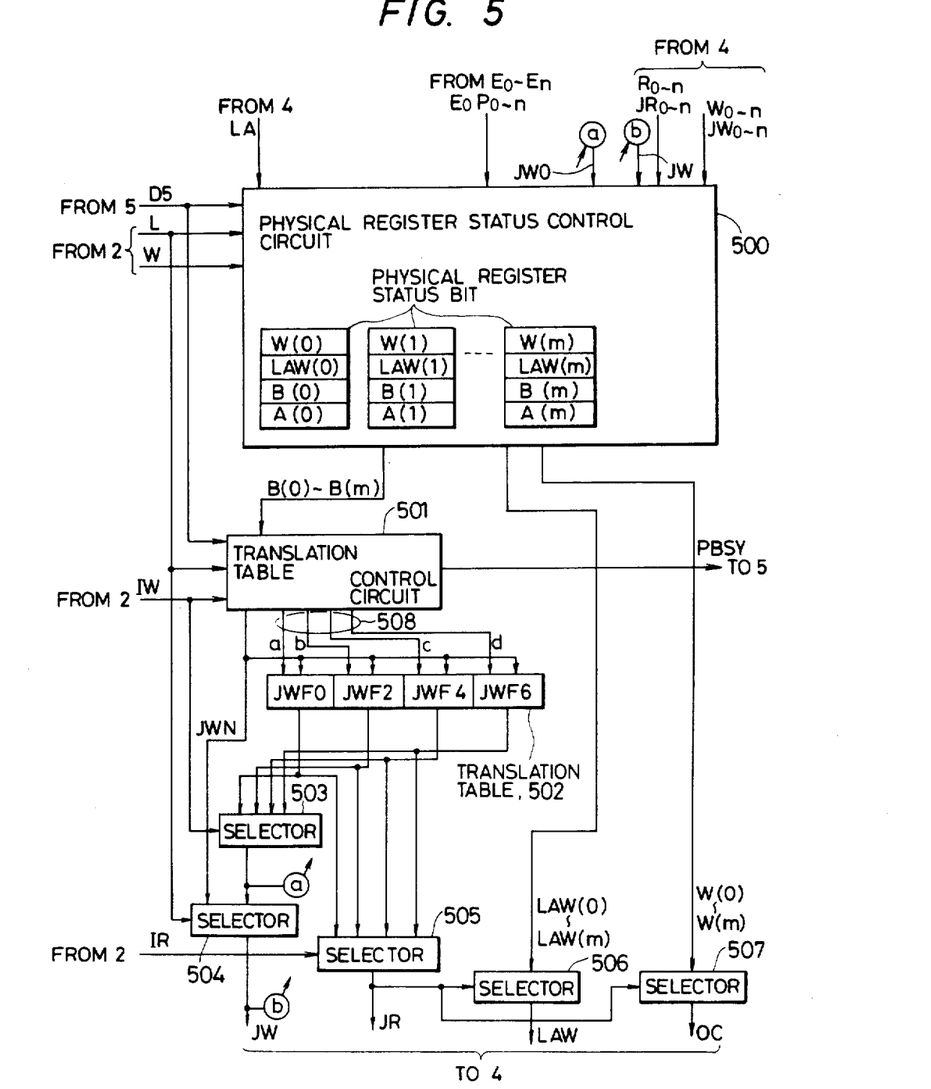
FIG. 5 shows the detailed construction of a virtual register control circuit.
Figure 9A:
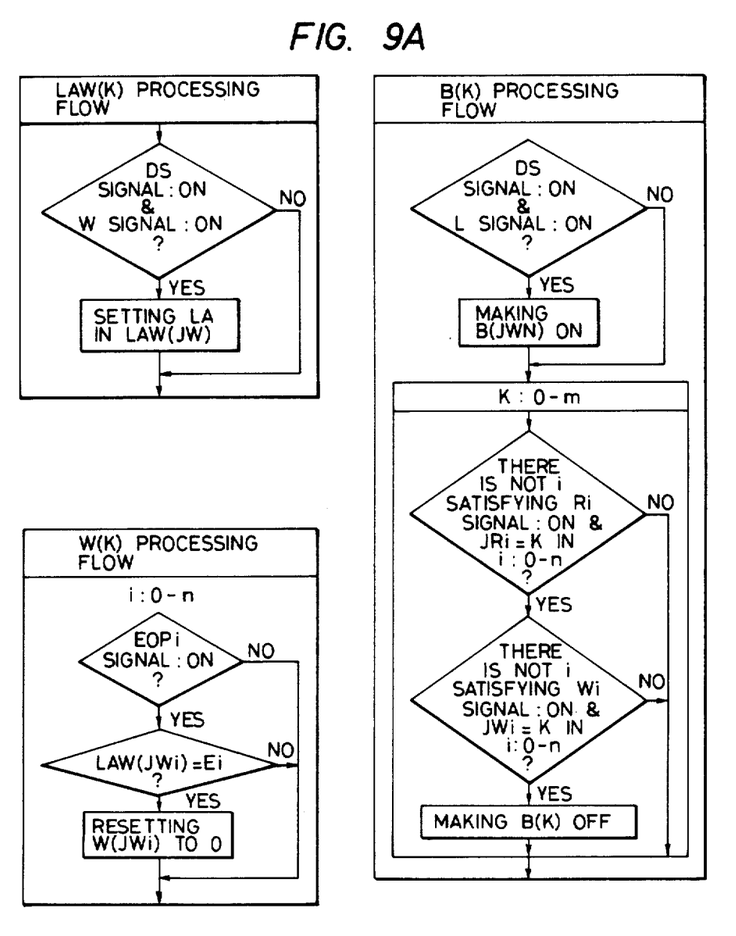
FIGS. 9A and 9B show processing flows of a physical register status control circuit.
Figure 9B:
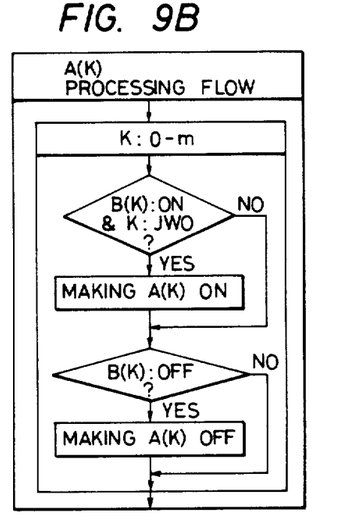

Next, the virtual register control circuit 3 will be described in more detail with reference to FIG. 5. Indicated at numeral 500 is a physical register status control circuit which has physical register status bits indicating the statuses of the (M+1) physical registers P0 to Pm, respectively, in each cycle and controls the renewal of the bits. The processing flows of the respective status bits are shown in FIGS. 9A and 9B. The following four bits belong to the physical register status bits:

(1) Not-stored bit W(k) (wherein k=0 to m): indicates that the instructions (i.e., those of the W-type) for storing the arithmetic result in a physical register PK are decoded but not written in to the end yet. This bit takes the binary 1, when the signal DS of said instruction is raised, and takes the value 0 when the storage of the result of the last instruction of those decoded already, that are to store the result in the physical register Pk, is ended. The control for this will be described in the following item (2).

(2) arithmetic unit number bit LAW(k) (wherein k=0 to m): indicates the arithmetic unit which is to be set up with the instruction for storing the arithmetic result in the physical register Pk as to the instruction decoded at last by said instruction. When the signal DS of the W-type instruction having the write-in physical register number JW (k) is raised, the bit LAW(k) is set with the value of the number LA of the arithmetic unit sent from the parallel operation control circuit 4. In case a succeeding instruction for effecting the write-in of the physical register Pk is decoded before the result of the physical register Pk by said instruction is not written in, the value of the bit LAW(k) sets the number of the arithmetic unit as to said succeeding instruction. Then, there is left in the bit LAW(k) the arithmetic unit number of the last one of instructions for effecting the write-in of the arithmetic unit Pk, that is decoded in the last order.

On the other hand, at the end of the operation of the arithmetic unit Ei, a signal EOPi is raised, and the result is written in the physical register indicated by the signal JWi if the former signal is of the W-type. If, at this time, the value of the bit LAW(JWi) indicates the arithmetic unit Ei, the physical register status control circuit 500 resets the bit W(JWi) at 0 to indicate that the storage of the results of all the instructions to the physical register of the number JWi is ended, because the last instruction for changing the physical register number JWi is said instruction itself having been ended by the arithmetic unit Ei just before. Unless the value of the bit LAW(JWi) indicates the arithmetic unit Ei, a succeeding instruction for changing the number JWio is already decoded to leave the bit W(Jwi) as it is. Here, said succeeding instruction for changing the number JWi is required to read out the number JWi as the input operand (Note 1: Of the W-type instructions, the instruction (e.g., a load instruction) not to designate the register for storing the result as the input operand never fails to be designated at the L-type instruction. As a result, since the succeeding instruction for storing the result not in the newly assigned register but in the register of the number JWi is not of the L-type, the register for storing the result is designated as the input operand). Therefore, after the operation and the result of the instruction for changing the preceding number JWi are stored to the end, the operation and the storage of the result are conducted. As a result, the operations of and the storages of the results of the plural instructions for storing the results in an identical physical register never fail to be conducted in the conceptual sequence of the instructions. If the bit LAW(k) and the bit W(k) are renewed by the aforementioned method, the bit W(k) takes the value 0 when the storage of the result of the last one of the instructions having been decoded already, that should effect storage of the result in the physical register Pk, is ended.

(3) Busy bit B(k) wherein k=0 to m): indicates that the physical register Pk is in its busy status. This busy status of the physical register Pk means that the read-out or the storage of the result of the register Pk is either not ended or possibly not ended.

The busy bit B(k) turns on the physical register Pk when the physical register Pk is newly assigned for storing the operand of the signal DS of the L-type instruction in case the signal DS is raised. The physical register number to be newly assigned is sent as the signal JWN from a later-described translation table control circuit 501 to the control circuit 500. On the other hand, when the logical number corresponding to said register Pk is indicated at IW, the L-type instruction for storing the result in the corresponding register IW is decoded so that another physical register Pl is newly assigned to the number IW (at this time, the bit A9k to be described in the following item (4) is turned on), the bit B(k) is turned off at the instant when both the read-out of the register Pk by all the instructions conceptually preceding said L-type instruction and the storage of the result are ended.

In this case, it is judged by the use of respective signals R0 to Rn, JR0 to JRn, W0 to Wn, and JW0 to JWn sent from the parallel operation control circuit 4 that both the read-out of the register Pk by all the instructions preceding said L-type instructions and the storage of the result are ended. If the read-out physical register numbers of for any turned-on signals of the signals R0 to Rn are designated by JRi1, JRi2, . . . , it can be judged that the read-out of the register Pk by all the preceding instructions is ended if there is no physical number coincident with the register Pk. If the write-in physical register numbers for any turned-on signals of the signals W0 to Wn are designated by JWi1, JWi2, . . . , on the other hand, it can be judged that the storage of the result of the register Pk by all the preceding instructions is ended if there is no physical register number coincident with the register Pk.

The content of the physical register Pk, in which the busy bit B(k) is off, may be selected from those having the off-busy bit B(k) when a new physical register is to be assigned by the load instruction, because the reference by all the preceding instructions is ended.

(4) Assign bit A(k) (wherein k=0 to m): indicates that the physical register Pk is in the assigned status. The assigned status of the register Pk means that the register Pk is in the busy status and that, when the logical number corresponding to the register Pk is designated as IW, another physical register is newly assigned by decoding the L-type instruction for the number IW. The bit A(k) is turned on when the physical register Pk is in the busy status (i.e., the bit B(k) is turned on), and when, if a logical number corresponding to said register Pk is designated at IW, as has been described in the above item (3), the L-type instruction for the number IW is decoded so that another physical register is newly assigned. As a result, when the L-type instruction is decoded, the old physical register number corresponding to that number IW is sent as a signal JW0 from a later-described selector 503 to the control circuit 500 thereby to indicate the physical register to turn on the assign bit A(k). Moreover, the bit A(k) turns off the register Pk when this register Pk is not in the busy status (i.e., the bit B(k) is turned off).

For the controls thus far desribed, the physical register status control circuit 500 is made receptive of the signal DS, the signals L, W, IW and IR from the instruction decoder 2, the signals R0 to Rn, JR0 to JRn, W0 to Wn, JW0 to JWn and LA from the parallel operation control circuit 4, the signals EOP0 to EOPn from the arithmetic units E0 to En, the JW signal from a selector 504 in the virtual register control circuit 3, and the JW0 signal from the selector 503.

A translation table 502 is composed of registers JWF0, JWF2, JWF4 and JWF6 for holding the physical register numbers corresponding to the logical register numbers 0, 2, 4 and 6.

Figure 10:
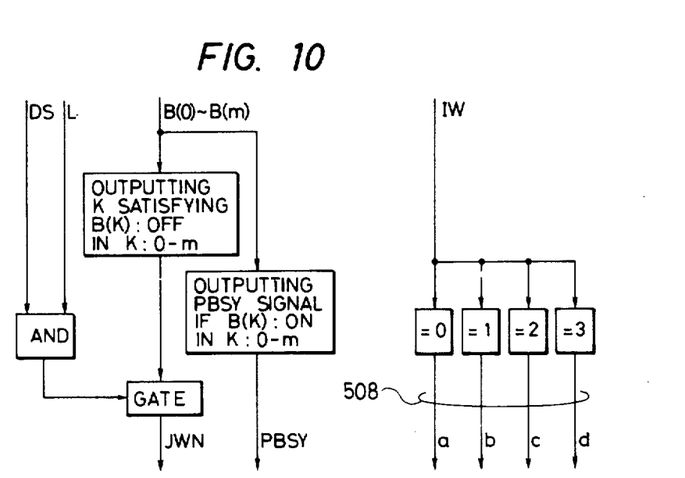
FIG. 10 shows the internal construction of a translation table control circuit 501.

Next, the internal construction of the translation table control circuit 501 will be described with reference to FIG. 10.

The translation table control circuit 501 selects a physical register, which is to be newly assigned, from the physical registers out of the busy status, when the L-type instruction is decoded, thereby to output the number JWN' of the register selected. When both the signals DS and L are turned on, the translation table control circuit 501 selects one in accordance with a suitable method from the turned-off signals of the busy bits B(0) to B(m) and outputs the number JWN of the busy bit selected. Moreover, the translation table control circuit 501 sends out a control signal 508 to each register of the translation table 502 so that the value of the number JWN may be stored in the register corresponding to that of the numbers JWF 0, 2, 4 and 6 in the translation table 502, which corresponds to the write-in logical register number IW of the L-type instruction. The storage of that number JWN is conducted at the end instant of the decode cycle of the L-type instruction so that the value stored is used for decoding of the next or later instructions. Moreover, the translation table control circuit 501 turns on the PBSY signal to send it to the decode control circuit 5 in case all the busy bits B(0) to B(m) are turned on, i.e., all the physical registers P0 to Pk are busy, when the signal L is turned on, so that the physical register to be newly assigned cannot be selected. As has been described hereinbefore, at this time, the decode control circuit 5 postpones the issue of the signal DS in response to the L-type instruction until the signal PBSY is turned off.

The selector 503 outputs the physical register number JW0 corresponding to the write-in logical register number IW of the instruction being decoded. For this operation, the selector 503 is fed with the content of the registers JWF0 to JWF6 of the translation table 502 in addition to the number IW. The number JW0 indicates in the L-type instruction the number which has been assigned to the number IW until that time.

The selector 504 selects the number JWN, when the signal L is turned on, and the number JW0, when the same is turned off, to output it as the signal JW. As a result, this JW signal indicates the number of the physical register to be stored with the result of all the W-type instructions whether or not it might be of the L-type.

A selector 505 outputs the physical register number JR corresponding to the read-out logical register number IR in the R-type instruction. As a result, the selector 505 receives the contents of the registers JWF0 to JWF6 of the translation table 502 and selects one of them indicated at the number IR to output it as the signal JR.

A selector 506 outputs the number LAW of the arithmetic unit, which is made operative to operate the instruction for effecting the write-in at last, to the physical register of the number JR for effecting the read-out in response to the R-type instruction. As a result, the selector 506 receives the numbers LAW(0) to LAW(m) of the physical register status bits and selects one indicated by the signal JR to output it as the signal LAW.

A selector 507 outputs the signal OC indicating occurrence of the operand conflict. As a result, the selector 507 receives the bits W(0) to W(m) of the physical register status bits and selects that indicated by the signal JR to output it as the signal OC.

Figure 6:
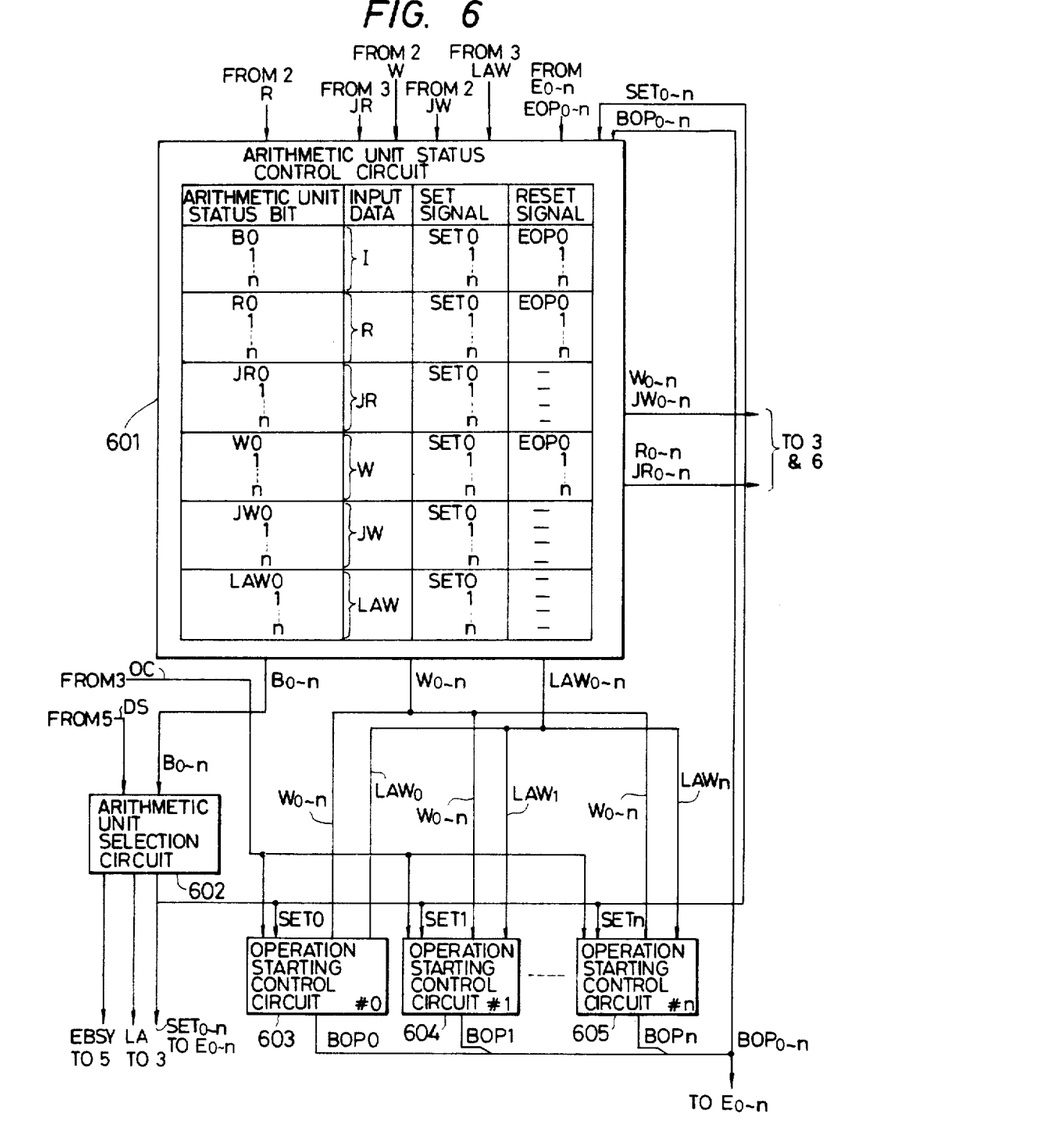
FIG. 6 shows the detailed construction of a parallel operation control circuit.

Next, the construction and operations of the parallel operation control circuit 4 will be described in detail with reference to FIG. 6.

Figure 11:
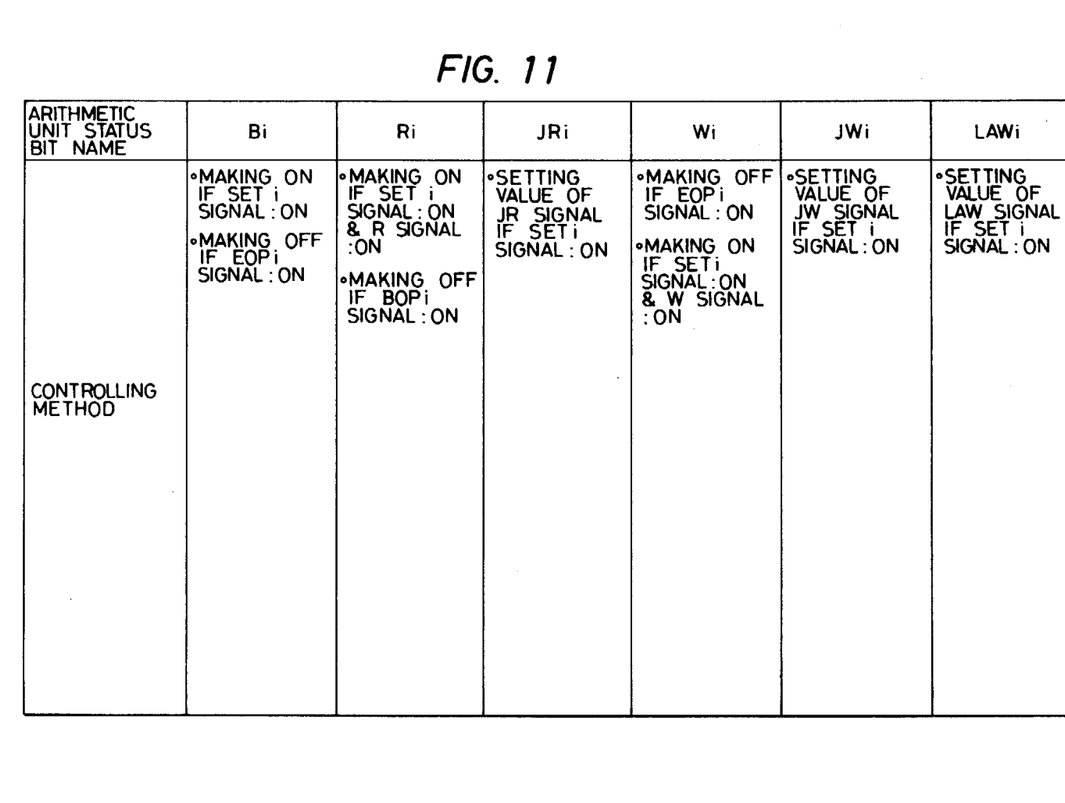
FIG. 11 shows a process for controlling arithmetic unit status bits.

Indicated at numeral 601 is an arithmetic unit status control circuit which has six kinds of arithmetic status bits indicating the statuses of the $(n+1)$ arithmetic units E0 to En in each cycle to control their renewals. FIG. 11 shows a method of controlling the six kinds of arithmetic unit status bits. The following are the arithmetic unit status bits, in which letter i represents the number 0 to n.

(1) Busy bit Bi: indicates that the arithmetic unit Ei is in its busy status. The busy status of the arithmetic unit Ei means that the instructions having been decided are set up in the arithmetic unit Ei (i.e., after the signal SETi has been issued) and the arithmetic execution of said instruction is not ended yet (i.e., the signal EOPi is issued).

This bit Bi is turned on in response to the signal SETi and turned off in response to the signal EOPi.

(2) Unused bit Ri: indicates instruction necessary for reading out the register is set up in the arithmetic unit Ei but the read-out is not ended yet.

This bit Ri is turned on, when the R-type instruction (i.e., the R-type signal is turned on) is set up (i.e., the signal SETi is turned on), and turned off when the operation of said instruction is started (i.e., the signal BOPi is turned on).

(3) Read-out register number JRi: indicates the register number to be read out in the R-type instruction which is set up in the arithmetic unit Ei. The value of the signal JR is taken in and sent out as the signal JRi when the signal SETi is issued.

(4) Not-stored bit Wi: indicates that the instruction for storing the result in the register is set up in the arithmetic unit Ei but that its storage is not ended yet.

This bit Wi is turned on, when the W-type instruction (i.e., the signal W is turned on) is set up (i.e., the signal SETi is turned on), and turned off when the result of said instruction is written in, i.e., when the operation is ended (i.e., the signal EOPi is turned on).

(5) Stored register number JWi: indicates the number of register for storing the result in response to the W-type instruction set up in the arithmetic unit Ei. When the signal SETi is issued, the value of the signal JW is taken in and sent as the number JWi.

(6) Final storage arithmetic unit number LAWi: indicates the number of the arithmetic unit having executed the operation of the instruction which has effected finally the storage of the result in the register required to be read out by the R-type instruction set up in the arithmetic unit Ei.

When the signal SETi is issued, the value of the signal LAW is taken in and sent as the number LAWi.

Figure 12:
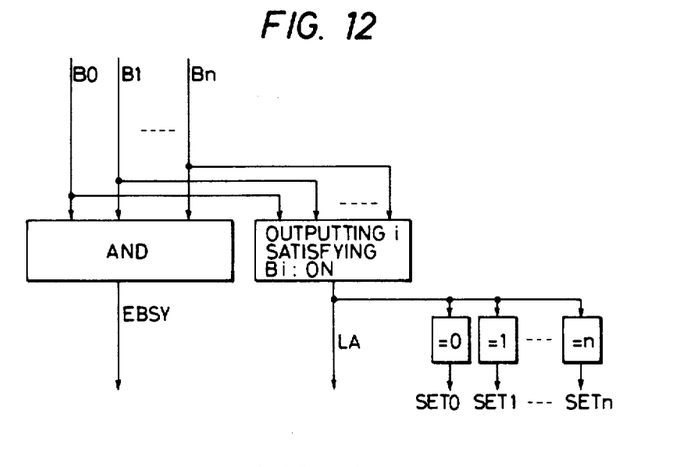
FIG. 12 show the internal construction of an arithmetic unit selection circuit.

Indicated at numeral 602 is an arithmetic unit selection circuit which has such an internal construction as is shown in FIG. 12. This arithmetic unit selection circuit 602 monitors the busy bits B0 to Bn to turn on the signal EBSY when all the bits are on, and selects any one of the unbusy arithmetic units when the instruction decoding is ended to issue the signal DS, outputs the number i (if the arithmetic unit Ei is selected) as the signal LA, and outputs the signal SETi.

Indicated at numerals 603 to 605 are operation starting control circuits #0 to #n which are provided in the arithmetic units, respectively. In FIG. 6, only the operation starting control circuits correpsonding to the arithmetic units E0, E1 and En are shown.

Figure 13:
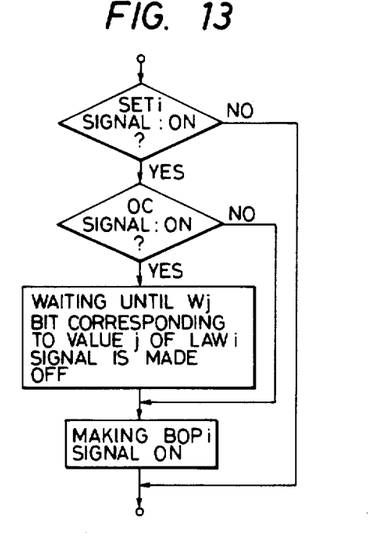
FIG. 13 is a processing flow chart showing an operation starting control circuit.

FIG. 13 is a flow chart showing the processing of the operation starting control circuit #i.

The operation starting control circuit #1 issues the operation starting signal BOPi instantly, if the operand conflict signal OC, which is sent out from the virtual register control circuit 3 when the instruction is set up in the arithmetic unit Ei (i.e., when the signal SETi is turned on), and monitors the busy bit of such an arithmetic unit Ei of the arithmetic units E0 to En as is indicated by the signal LAWi thereby to issue the signal BOPi when the busy bit is turned off. The fact that the signal OC is off when the signal SETi is on means that there is no operand conflict with the preceding instruction when the instruction is set up in the arithmetic unit Ei, and that the operand read out from the physical register indicated by the number JRi is effective so that the operation is started promptly in the arithmetic unit Ei by the use of the effective operand. On the other hand, the fact that the signal OC is turned on means that there is established the operand conflict with the preceding instruction at the instant when said instruction is set up in the arithmetic unit Ei. The not-stored bit Wj of the arithmetic unit for generating the operand data required by said instruction, i.e., the arithmetic unit Ej (which number j is sent out from the arithmetic unit status control circuit 601 in response to the signal LAWi), which is set up with the instruction for storing the arithmetic result finally in the physical register indicated at the number JRi, thereby to issue the signal BOPi when the unstored bit Wj is turned off.

(Description of the Processing Operations of the Instruction Row)

Figure 7A:
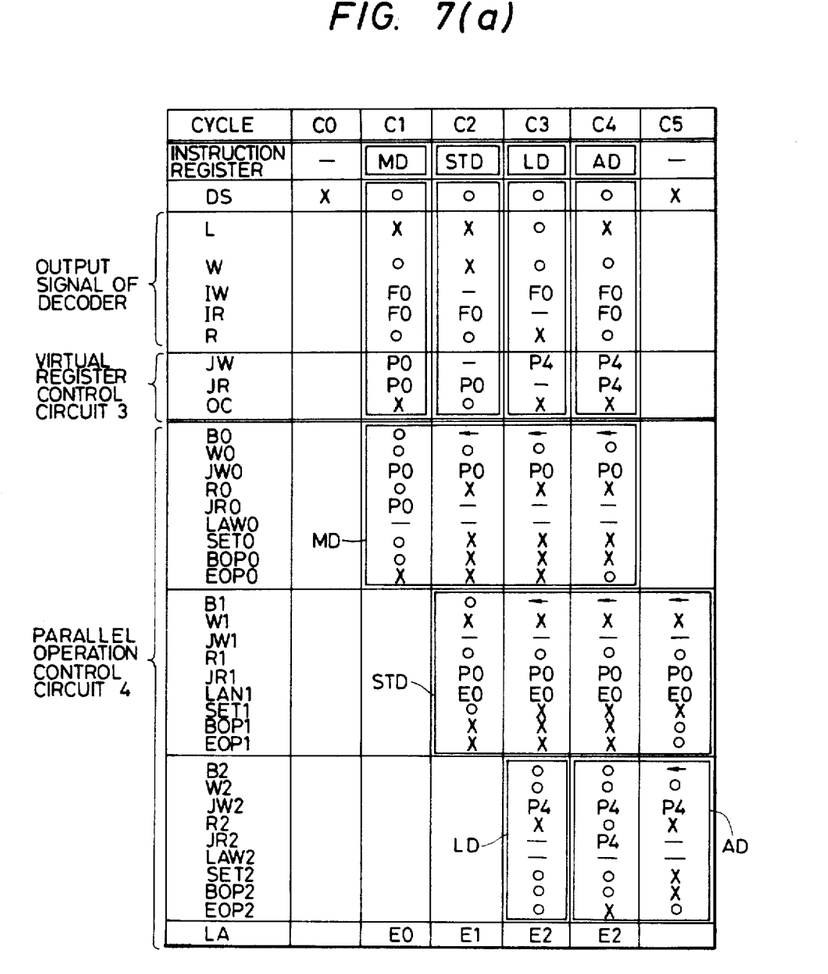
Figure 7B:
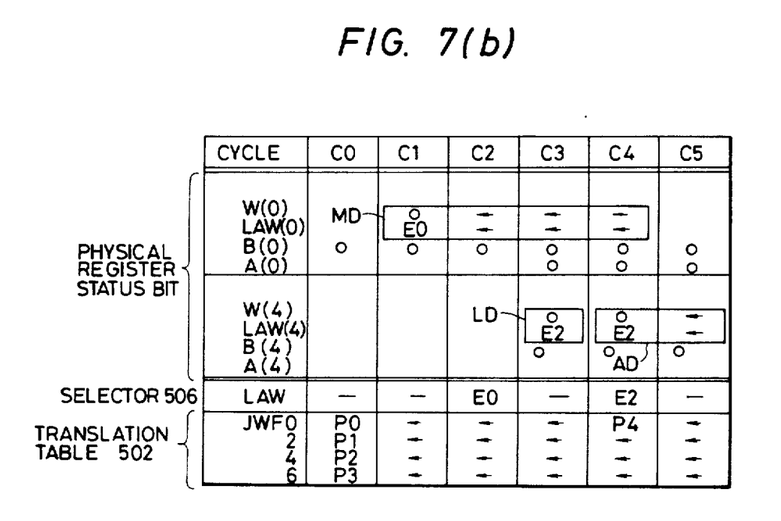

The operations in case the instruction sequence composed of the four instructions shown in FIG. 2 is processed by the processing device thus far described will be described in more detail with reference to FIGS. 7(a) and 7(b). In FIGS. 7(a) and 7(b), the horizontal line designates the time period in a unit of each cycle and tabulates the cycle C0 immediately before the first instruction MD is set in the instruction register 1 to the cycle C when all the processing of said four instructions are ended. On the other hand, the column designates the registers or signals in the processing device, as has been described with reference to FIGS. 4, 5 and 6, and not only those values at each time from the cycle C0 to the cycle C5 but also which of the instructions to be processed correspond to those values, such that they are enclosed by rectangles.

In the cycle C0, the translation table 502 is assumed to be made such that the register JWF0 corresponds to the physical register P0, the register JWF2 to the physical register P1, the register JWF4 to the physical register P2, and the register JWF6 to the physical register P3. As a result, it is assumed that the busy bits B(0 to 3) of the physical registers P0 to P3 are on, that the busy bits B(4 to m) of the physical registers P4 to Pm are off, and that all the busy bits B0 to Bn of the arithmetic units E0 to En are off.

It is assumed that the instruction MD be fed to the instruction register 1 in the cycle C1. The operations concerning the instruction MD will be described in the following. In the instruction decoder 2, the decoding is conducted in the cycle C1 so that the signals W and R are turned on and that the logical register number 0 indicating the F0 is fed as the signals IW and IR. (In the drawing, the indication F0 is intentionally used. The numbers of the physical registers and the arithmetic units are also indicated as P0 and E0 in the following.)

In the virtual register control circuit 3, the value P0 stored in the JWF0 is read out in accordance with the value F0 of the signal IW by the selectors 503 and 504 and is outputted as the signal JW. Likewise, the value P0 is read out in accordance with the value F0 of the signal IR by the selector 505 and is outputted as the signal JR. For simplicity of description, it is assumed that the number of arithmetic units and physical registers is sufficient. Hence, the signals EBSY and PBSY are not turned on at all during the processing of the aforementioned instruction sequence. As a result, the decode control circuit 5 instantly turns on the signal DS to indicate that the decoding of the instruction MD is ended.

In the selector 507, the not-stored bit W(0) of the physical register P0 is read out, and the signal OC is off because the bit W(0) is off in the cycle C1 before it is changed by said instruction MD.

In response to the signal DS, the arithmetic unit selection circuit 602 selects E0 as the vacant arithmetic unit and issues this arithmetic unit number as both the signal LA and the signal SET0.

The operation starting control circuit 603 instantly issues the signal BOP0 because the signal OC accompanying the signal SET0 of the instruction MD is off in the cycle C1.

The arithmetic unit status control signal 601 responds to the signal SET0 to turn on the bits B0, W0 and R0 and stores the values P0 and P'0 of the signals JW and JR in the bits JW0 and JR0. The operation of the instruction MD continues from the cycle C1 to the cycle C4 so that the signal EOP0 indicating the end is issued in the cycle C4. Meanwhile, both the busy bit B0 and the not-stored bit W0 of the arithmetic unit E0 are on, and the value P0 is continually held as the value of the bit JW0. At the end of the operation, the result DW0 is written in synchronism with the signal EOP0 in the physical register indicated by the bit JW0 (=P0).

The virtual register control ciruit 3 turns on the status bit W(0) of the physical register P0 in the cycle C1, and the number E0 indicating the arithmetic unit set up with the instruction MD is introduced into the bit LAW(0). These values are held until the cycle C4 in which the signal EOP0 of the instruction MD is issued. In response to the rise of the decode end signal DS of the instruction MD, the next instruction STD is set in the instruction register 1 in the cycle C2. The operations concerning the instruction STD will be described in the following. In the cycle C2, the instruction STD is decoded in the instruction decoder 2 and turns on the signal R, and the F0 enters the signal IR. The virtual register control circuit 3 reads out the value P0 of the register JWF0 by the selector 505 in accordance with the value F0 of the signal IR to output it as the signal JR. In response to the instruction STD, the decode control circuit 5 instantly turns on the signal DS to indicate the end of the decode. Since the bit W(0) at the start of the cycle C2 is turned on by the instruction MD, the signal OC is turned on in the cycle C2. In response to the signal DC in the cycle C2, moreover, the arithmetic unit selection circuit 602 selects the E1 as the vacant arithmetic unit to output this number as the signal LA and to issue the signal SET1.

The operation starting control circuit 603 (#1) reserves the issuance of the signal BOP1 since the signal OC accompanying the signal SET1 of the instruction STD is on in the cycle C2.

The arithmetic unit status control circuit 601 turns on the bits B1 and R1 in response to the signal SET1 and stores the value of the signal JR in the bit JR and the value E0 of the signal LAW in the bit LAW1. The processing of the instruction STD after the cycle C3 is required to monitor the end of the preceding instruction MD. In accordance with the arithmetic unit number E0 stored in the bit LAW1, the not-stored bit W0 of the arithmetic unit E0 is monitored to issue the signal BOP1 when it is judged that the operand conflict is eliminated in the cycle C5 in which the bit W0 is off. The arithmetic stage of the instruction STD is ended for one cycle, and the signal EOP1 is issued instantly at the cycle C5. Meanwhile, the busy bits B1 and the bit R1 of the arithmetic unit E1 are on, and the values P0 and E0 are continuously held as those of the bits JR1 and LAW1.

In response to the rise of the decode end signal DS of the instruction STD, the next instruction LD is set in the instruction register 1 in the cycle C3. The operations concerning the instruction LD will be described in the following. In the cycle C3, the decoding is conducted in the instruction decoder 2 to turn on the signals L and W and to feed the value F0 to the signal IW. The virtual register control circuit 3 reads out the value P0, which is stored in the register JWF0, in accordance with the value F0 of the signal IW by the selector 503 to set the value of the signal JW0 at P0. Moreover, the translation table control circuit 501 responds to the signals DS and L, which are turned on, to search any turned-off bits of the busy bits B(0) to B(m) thereby output the corresponding physical register number as the signal JWN. Now, it is assumed that the bits B(4) to B(m) are off, and that the smallest number of the physical register P4 is output as the signal JWN.

The selector 504 outputs the value P4 of the signal JWN as the signal JW because the L-type signal is on in the cycle C3. In response to the instruction LD, the signal DS is also issued instantly in the cycle C3. In response to this DS signal, the arithmetic unit selection circuit 602 selects the unit E2 as the vacant arithmetic unit to output the number thereof as the signal LA and to issue the signal SET2. Since the instruction LD does not effect the read-out of the register, the signal OC is not turned on. The operation starting control circuit #2 instantly issues the signal BOP2 since the signal OC accompanying the signal SET2 of the instruction LD is off in the cycle C3.

In response to the signal SET2, the arithmetic unit status control circuit 601 turns on the bits B2 and W2 and stores the value P4 of the signal JW in the bit JW2. Since the operation of the instruction LD is ended for one cycle, the signal EOP2 is issued in the cycle C3. The busy bit B2 and the bit W2 of the arithmetic unit E2 are on for the cycle C3.

The virtual register control circuit 3 turns on the status bit W(4) of the physical register P4, which is indicated by the signal JW, in the cycle C3 and feeds the bit LAW(4) with the number E2 indicating the arithmetic unit, which is set up with the instruction LD, i.e., the value of the signal LA. These values are held for one cycle because the signal EOP2 is instantly issued in the cycle C3 in response to the instruction LD. In the cycle C3, the assign bit A(0) of the physical register P0 indicated by the signal JW0 is turned on. At the end of the cycle C3, the register JWF0 of the translation table 502 indicated by the value F0 of the signal IW is set with the number P4 of the physical register which is newly assigned to the logical register F0.

In response to the rise of the decode ending signal DS of the instruction LD, the following instruction AD is set in the instruction register 1 in the cycle C4. The operations concerning the instruction AD will be described in the following. In the cycle C4, the instruction decoder 2 conducts the decoding to turn on the signals W and R and to feed the value F0 to the signals IW and IR. The virtual register control circuit 3 reads out the value P4 of the JWF0 of the translation table 502 in accordance with the value of the signal IW to use the read value as that of the signal JW. Moreover, in accordance with the value F0 of the signal IR, the value P4 of the JWF0 of the translation table 502 is read out as the signal JR in accordance with the value F0 of the signal IR. Also, in response to the instruction AD, the signal DS is turned on instantly in the cycle C4. The bit W(4) at the start of the cycle C4 is off because the instruction LD ends the write-in of the result in the previous cycle C3. As a result, the signal OC is off in the cycle C4. In response to the signal DS in the cycle C4, the arithmetic unit selection circuit 602 selects the unit E2 as the vacant arithmetic unit to output the number thereof as the signal LA and to issue the signal SET2. The operation starting control circuit #2 issues instantly the signal BOP2 because the signal OC of the instruction AD is off in the cycle C4. In response to the signal SET2, the arithmetic unit status control circuit 601 turns on the bits B2, W2 and R2 and stores the values P4 and P4 of the signals JR and JW in the bits JR2 and JW2, respectively. Since two cycles are required for the operation of the instruction AD, the signal EOP2 is issued in the cycle C5. Meanwhile, the values of the bits B2, W2 and JW2 are held in the arithmetic unit E2.

The virtual register control circuit 3 turns on the status bit W(4) of the physical register P4 indicated by the signal JW and sets the value E2 of the signal LA in the bit LAW(4). These values are held until the signal EOP2 of the instruction AD is issued in the cycle C5.

At last, in the cycle C5, if the signal BOP1 of the instruction STD is issued, the reference to the physical register P0 is wholly ended so that the busy bit B(0) and the assign bit A(0) are turned off. As a result, the physical register P0 comes into its vacant status in the cycle succeeding the cycle C5.

As has been described hereinbefore, the processings of the aformentioned four instructions are ended after the five cycles C1 to C5, and the processings of the instructions MD and STD and the instructions LD and AD are conducted in parallel for that time period.

According to the present invention, if the maximum number of the instructions to be parallel-processed is designated as N, and if the number of the register changing instructions is designated as n, it is possible to eliminate the factors blocking the parallel-processing, which are caused by the repeated uses of the registers in response to the plural instructions. The logical scale can be remarkably reduced in view of the fact that the CDB system requires a 2N number of instructions. In case the arithmetic results are obtained in response to an M number of instructions, the time period required for transferring the results to the instructions requiring them is M cycles in the CDB system. However, the system of the present invention can be operated only for one cycle so that its speed can be increased.

What is claimed is:

1. A data processing device comprising: a plurality of arithmetic units for processing a plurality of instructions in parallel; a plurality of first and second registers, for storing both data to be processed by said arithmetic units and the processed results of said arithmetic units; a control circuit for dynamically assigning different ones of said second registers to those instructions which designate an identical one of said first registers; and means maintaining the corresponding relationship between said first register and said assigned second registers while the instructions are processed in parallel in said arithmetic units.

2. A data processing device according to claim 1, wherein said control circuit comprises:
   decode means for decoding said instructions;
   assigning means, responsive to said decode means, for assigning numbers of said first registers to corresponding numbers of said second registers; and
   control means, responsive to said decode means and said assigning means, for controlling transfer of data between said arithmetic units and said first and second registers.

3. A data processing device corresponding to claim 2, wherein said assigning means comprises:
   register status control means for indicating the status of said second registers;
   translation table control means, responsive to said register status control means and said decode means, for selecting one of said second registers to be newly assigned;
   translations table means, responsive to said translation table control means, for holding the numbers of said second registers corresponding to the numbers of said first registers which are selected by said translation table control means; and
   selector means, responsive to said translation table means, for selecting one of said second registers based on the outputs of said register status control means, said translation table control means, said translation table means and said decoder means.

4. A data processing device according to claim 3, wherein said selector means comprises:
   first selector means, responsive to the outputs of said translation table means and said decode means, for selecting the number of one of said second registers where a decoded instruction is to be stored;
   second selector means, responsive to the output of said decoder means and said translation table means, for selecting one of said second registers, from which the decoded instruction is to be read;
   third selector means, responsive to said register status control means and said second selector means, for selecting the arithmetic unit where the instruction will be processed; and
   fourth selector means, responsive to said register status control means and said second selector means, for detecting when information from a processing instruction is not available for processing the present instruction.

5. A data processing device according to claim 2, wherein said control means comprises:
   an arithmetic unit status control means for indicating the status of the arithmetic units, including an indication of which units are busy and the type of information from a particular instruction that is stored therein; and
   arithmetic unit selection means for monitoring the status of the arithmetic units, for signaling the decode means when no arithmetic units are available and for outputting the number of the arithmetic unit that is available to the register status control means.

6. A data processing device comprising:
   means for inputting instructions;
   a plurality of registers;
   detecting means for detecting when more than one of said instructions requires the use of the same one of said plurality of registers;
   assigning means, responsive to said detecting means, for dynamically assigning a different one of said plurality of registers to store one of the instructions when said same one of said plurality of registers is being used for another instruction;
   transfer means, responsive to said assigning means, for transferring data to selected ones of a plurality of arithmetic units; and
   control means, responsive to said assigning means, for controlling said arithmetic units such that the instructions are processed in parallel.

7. A data processing device comprising:
   means for inputting instructions;
   a plurality of registers;
   detecting means for detecting when more than one of said instructions requires the use of the same one of said plurality of registers;
   assigning means, responsive to said means for detecting, for dynamically assigning a different one of said plurality of registers to store one of the instructions when said same one of said plurality of registers is being used for another instruction; and
   control means for controlling the transfer of data between said means for assigning and one of a plurality of arithmetic units such that said instructions are processed in parallel.

* * * * *